United States Patent
Dudar (10) Patent No.: US 10,151,265 B2
(45) Date of Patent: Dec. 11, 2018

(54) METHODS AND SYSTEM FOR A HYDROCARBON SENSOR RATIONALITY CHECK

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/405,231

(22) Filed: Jan. 12, 2017

(65) Prior Publication Data

US 2018/0195467 A1    Jul. 12, 2018

(51) Int. Cl.
| | |
|---|---|
| F02D 41/22 | (2006.01) |
| F02M 25/08 | (2006.01) |
| F02M 37/00 | (2006.01) |
| F02D 41/00 | (2006.01) |

(52) U.S. Cl.
CPC ....... *F02D 41/222* (2013.01); *F02D 41/0042* (2013.01); *F02M 25/0809* (2013.01); *F02M 25/0836* (2013.01); *F02M 25/0854* (2013.01); *F02M 37/0076* (2013.01)

(58) Field of Classification Search
CPC .............. F02D 41/222; F02D 41/0042; F02M 25/0809; F02M 25/0836; F02M 37/0076
USPC ...................... 123/519, 520, 518, 516, 198 D
See application file for complete search history.

(56) References Cited

U.S. PATENT DOCUMENTS

| | | | | |
|---|---|---|---|---|
| 4,949,695 | A * | 8/1990 | Uranishi | F02M 25/0809 123/198 D |
| 5,898,107 | A | 4/1999 | Schenk | |
| 6,293,261 | B1 * | 9/2001 | Oemcke | F02M 25/0854 123/516 |
| 8,573,187 | B2 * | 11/2013 | Knittel | F02D 41/0045 123/518 |
| 2005/0229688 | A1 * | 10/2005 | Miyahara | F02M 25/08 73/114.41 |
| 2007/0157908 | A1 * | 7/2007 | Kano | F02M 25/08 123/520 |
| 2013/0152905 | A1 | 6/2013 | Woods et al. | |
| 2015/0085894 | A1 * | 3/2015 | Yang | G01M 3/002 374/4 |
| 2015/0122229 | A1 * | 5/2015 | Dudar | F02M 25/0818 123/518 |
| 2016/0305352 | A1 * | 10/2016 | Pursifull | F02M 35/104 |

OTHER PUBLICATIONS

Dudar, Aed M., "Method and System for Sensor Rationality Check," U.S. Appl. No. 15/215,415, filed Jul. 20, 2016, 33 pages.
Dudar, Aed M., "Systems and Methods for Diagnosing Components in a Vehicle Evaporative Emissions System," U.S. Appl. No. 15/248,817, filed Aug. 26, 2016, 67 pages.

\* cited by examiner

*Primary Examiner* — Mahmoud Gimie
(74) *Attorney, Agent, or Firm* — Julia Voutyras; McCoy Russell LLP (57) ABSTRACT

Methods and systems are provided for performing rationality check of a hydrocarbon sensor in an evaporative emission control system. In one example, a method may include sensing fuel vapors vented from a fuel vapor canister to atmosphere via the sensor, and performing sensor rationality check by flowing fuel vapors from a fuel tank to the fuel vapor canister via the sensor during loading of the fuel vapor canister.

20 Claims, 6 Drawing Sheets

METHODS AND SYSTEM FOR A HYDROCARBON SENSOR RATIONALITY CHECK

FIELD

The present description relates generally to methods and systems for detecting degradation of a sensor for monitoring hydrocarbon breakthrough from a fuel vapor canister.

BACKGROUND/SUMMARY

Hybrid vehicle fuel systems may include a sealed fuel tank configured to withstand high fuel tank pressure and vacuum levels. The vehicle may include a fuel tank isolation valve to seal the fuel tank from the atmosphere. Pressure in the fuel tank may build up due to the generation of fuel vapors. If the pressure inside the fuel tank reaches the capacity of the fuel tank, fuel vapors may be released from the fuel tank into a fuel vapor canister by opening the fuel tank isolation valve. Hydrocarbons (HCs) in the fuel vapors may be adsorbed and stored in the fuel vapor canister, and the rest of the fuel vapors may be vented to atmosphere. At a later time, such as when the engine is in operation, stored HCs in the fuel vapor canister may be purged into an engine intake manifold and combusted as fuel. However, due to non-uniform purge flow within the canister, the fuel vapor canister may not be completely purged. Consequently, retained HCs may breakthrough from the fuel vapor canister and vent to the atmosphere as a bleed emission. A hybrid vehicle may in particular suffer from bleed emissions due to limited engine runtime. Further, bleed emission may be significant for a vehicle that has been parked in high ambient temperature for a long duration.

Other attempts to address bleed emissions including arranging a fuel vapor sensor at the fresh air port of the fuel vapor canister. One example approach is shown by Oemcke et al. in U.S. Pat. No. 6,293,261. Therein, fuel vapor content exiting the fuel vapor canister is monitored in real time by the fuel vapor sensor. However, the inventors herein have recognized potential issues with such systems. As one example, the fuel vapor sensor needs to be rationalized (e.g., diagnosed) in the presence of HCs. However, since the fuel vapor sensor is positioned at the fresh air port of the fuel vapor canister, the fuel vapor sensor may only detect HCs when there is HC breakthrough from the canister to the atmosphere. When the fuel vapor canister functions effectively and is thoroughly purged, fuel vapors flowing through the fuel vapor sensor may contain little or no HCs. Due to the sensor's limited exposure to HCs, degradation of the fuel vapor sensor may be left undetected. Consequently, bleed emissions at a later time may not be effectively monitored and controlled. Other approaches to rationalize the fuel vapor sensor include determining fuel vapor sensor degradation during fuel vapor canister purging. During fuel vapor canister purging, fresh air is first routed from a purge port to the vent port of the canister, and then flows desorbed HCs to a manifold of the engine via a HC sensor, such that the HC sensor rationality check may be performed as desorbed HCs flow through the HC sensor. However, in hybrid vehicles, such as a plug-in hybrid electric vehicle, engine running conditions may be infrequent. Since fuel vapor canister purging occurs during engine running, canister purge events may be rare. As such, opportunities for performing HC sensor rationality checks may be limited.

In one example, the issues described above may be addressed by a method for an engine, comprising: during loading of a fuel vapor canister, actuating one or more valves to flow fuel tank vapors from a fuel tank to a first valve coupled to a fresh air side of the fuel vapor canister; sensing hydrocarbons with the a sensor positioned in a flow path of the fuel tank vapors and fluidly coupled to fresh air; and diagnosing operation of the sensor based on the sensed hydrocarbons. In this way, degradation of the sensor may be regularly checked for proper operation despite infrequent engine on conditions.

As one example, a method for an engine comprises, loading a fuel vapor canister by flowing fuel vapors from a fuel tank to a purge port of the canister, and monitoring HC content in fuel vapors flowing from the fuel tank to the purge port of the canister by a HC sensor. As fuel vapors flow through the HC sensor, the HC sensor rationality check is performed. After finishing the rationality check, the method may include flowing fuel vapors from the fuel tank to a load port to continue loading the fuel vapor canister. Alternatively, if the HC rationality check is not required during canister loading, fuel vapor canister loading may be performed by flowing fuel vapors from the fuel tank to the load port of the canister. As such, fuel vapors may flow to the canister in a first direction or second direction during canister loading depending on whether HC sensor rationality check is requested. By performing the HC rationality check during canister loading, the HC sensor may be exposed to high levels of HCs to diagnose the sensor during engine off conditions. Thus, proper functioning of the HC sensor may be checked regularly regardless of how frequently an engine is running. As a result, detection of canister breakthrough may be improved, thereby reducing HC emissions from the fuel system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
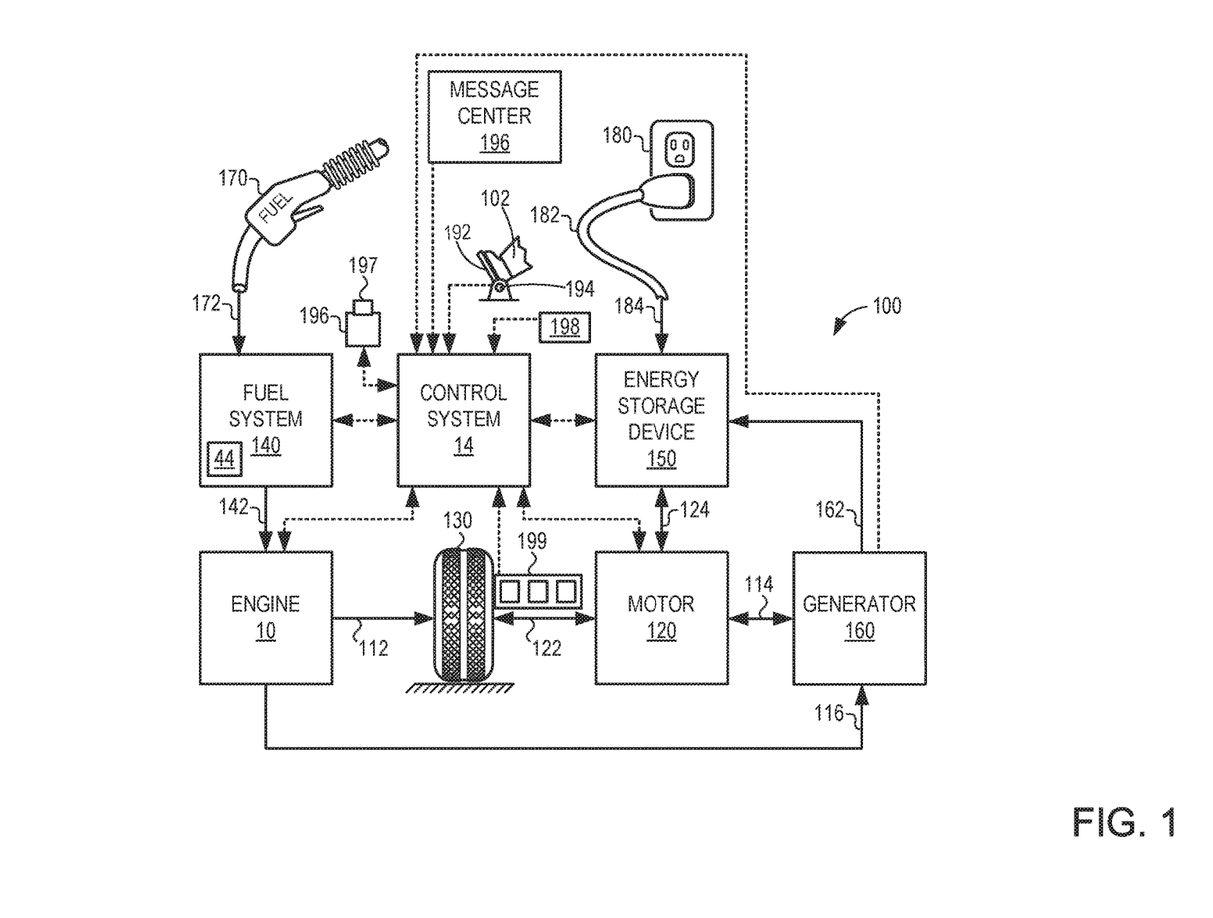
FIG. 1 schematically shows an example vehicle propulsion system.
Figure 2:
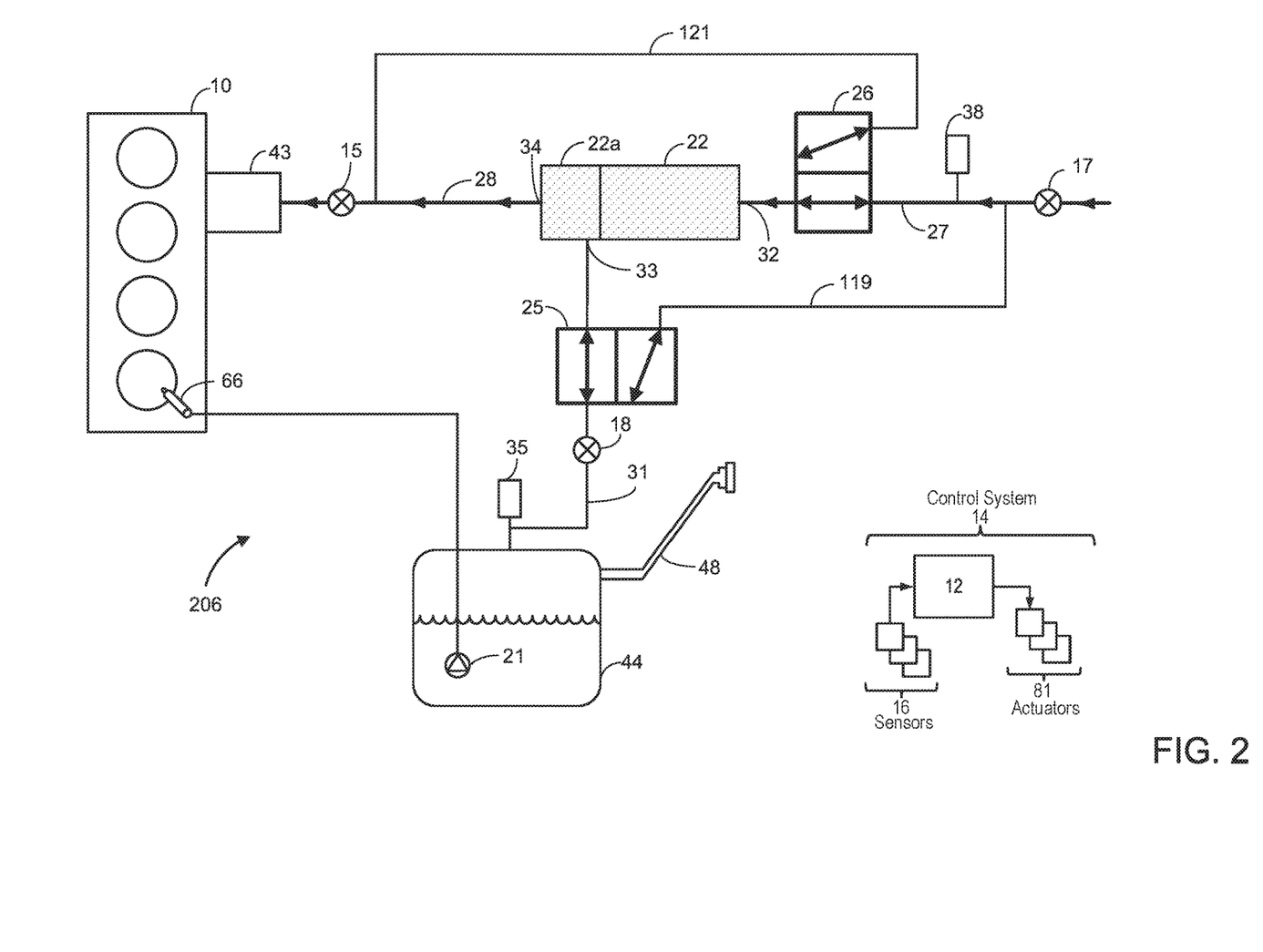
FIG. 2 illustrates an example engine coupled with a fuel system and an evaporative emission control system and an example system configuration for purging a fuel vapor canister.
Figure 3:
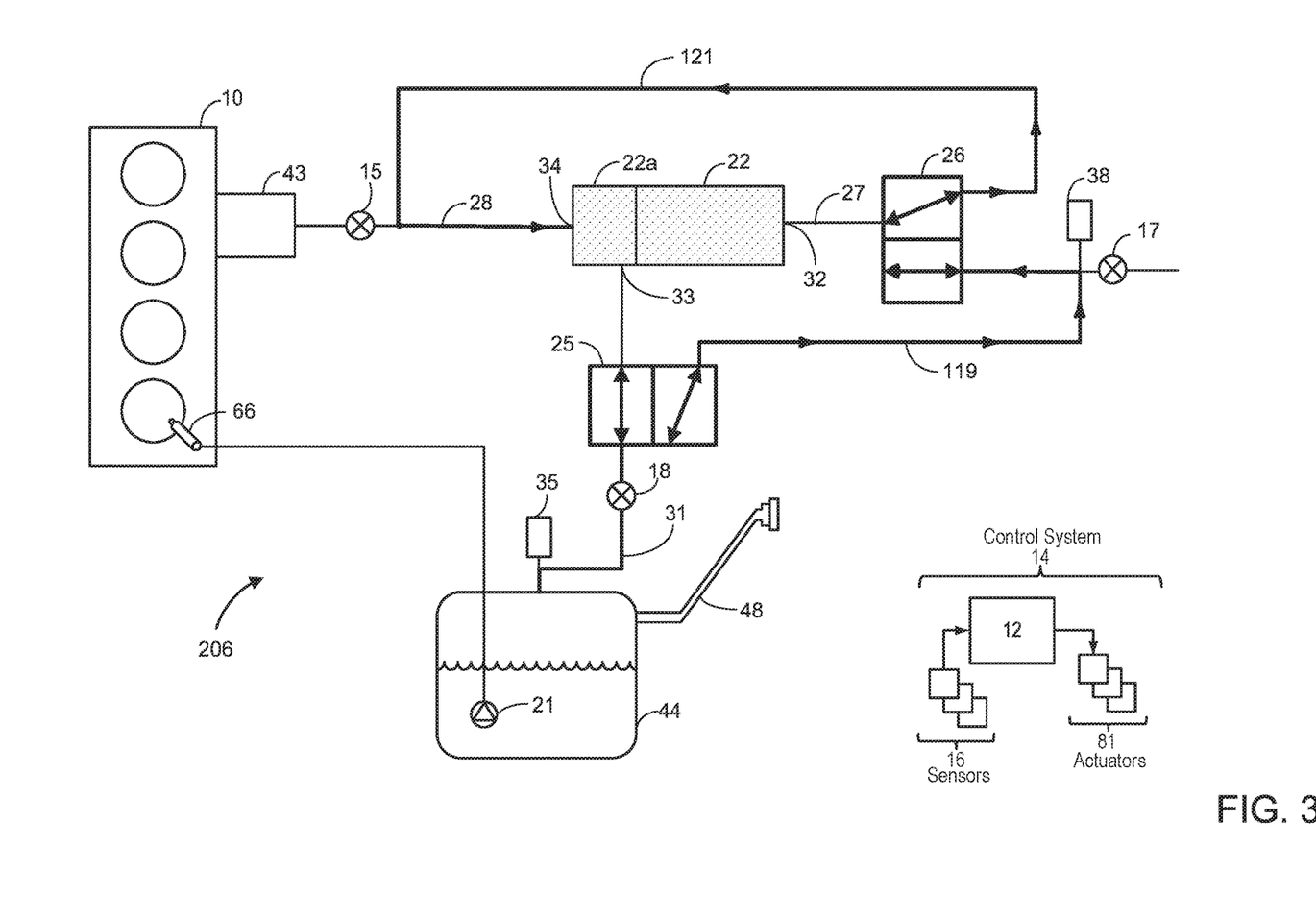
FIG. 3 shows an example system configuration for loading the fuel vapor canister and performing a sensor diagnosis.
Figure 4:
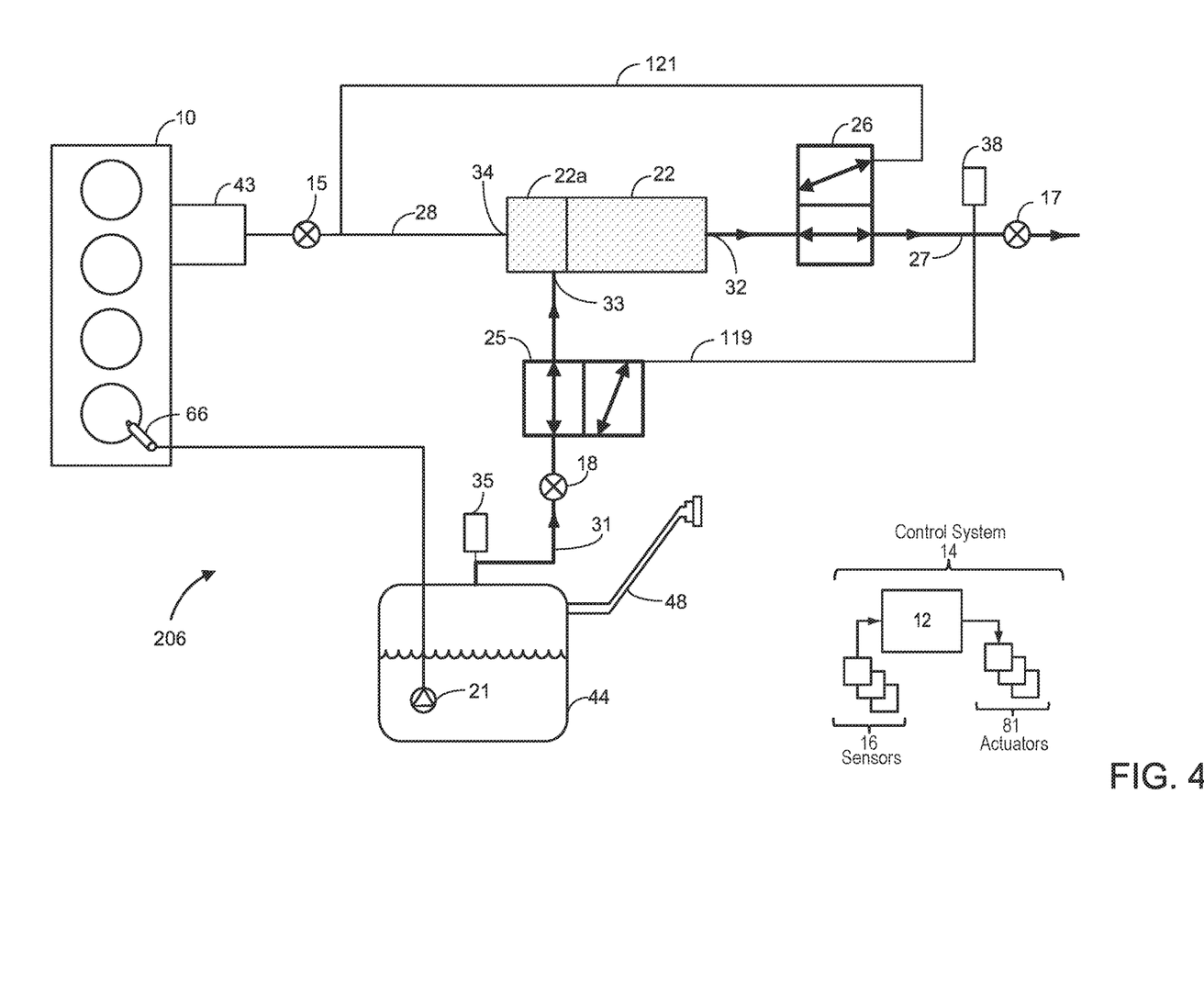
FIG. 4 shows another example system configuration for loading the fuel vapor canister.
Figure 5:
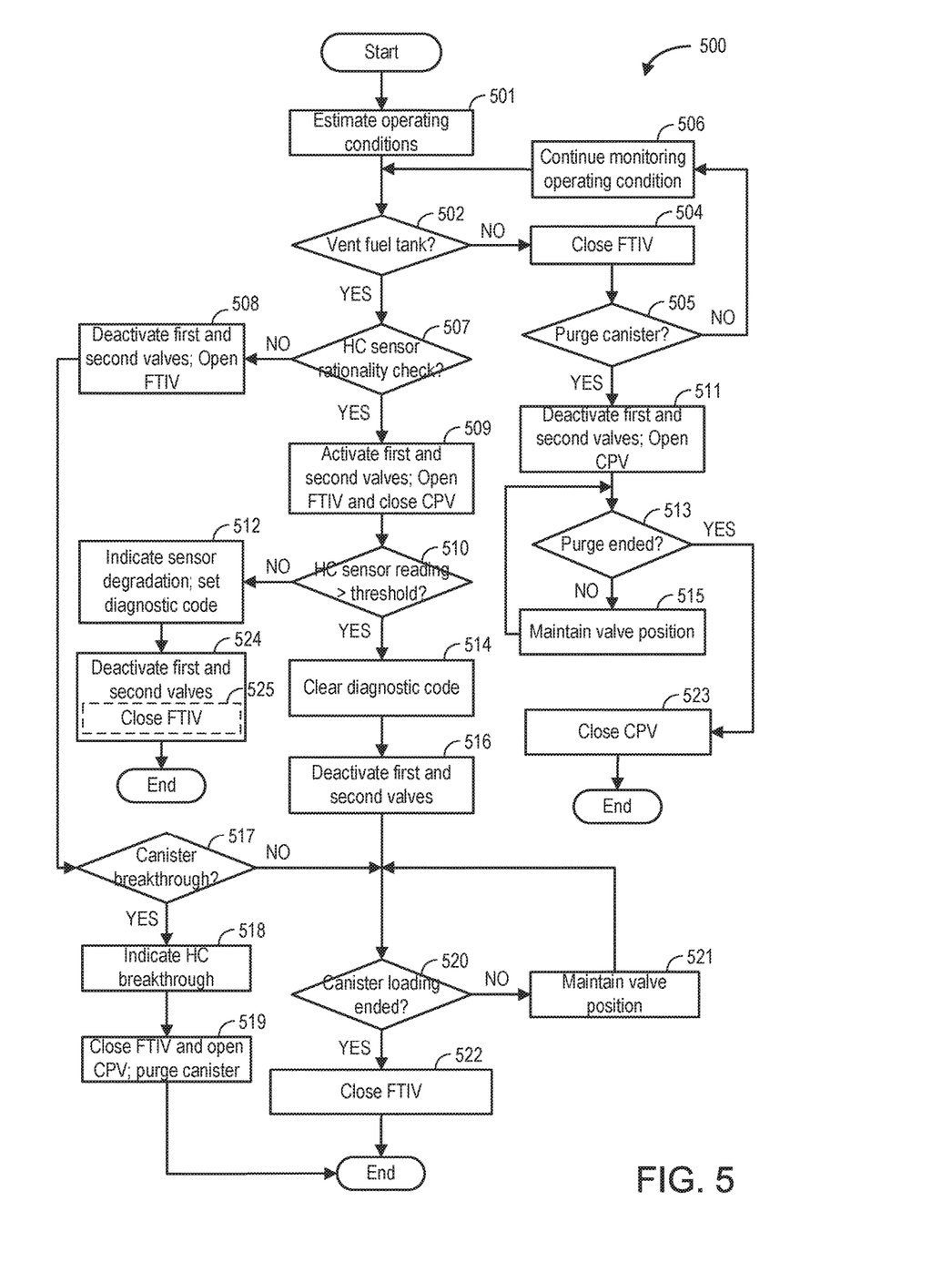
FIG. 5 is a flow diagram demonstrating an example method of performing sensor rationality check.
Figure 6:
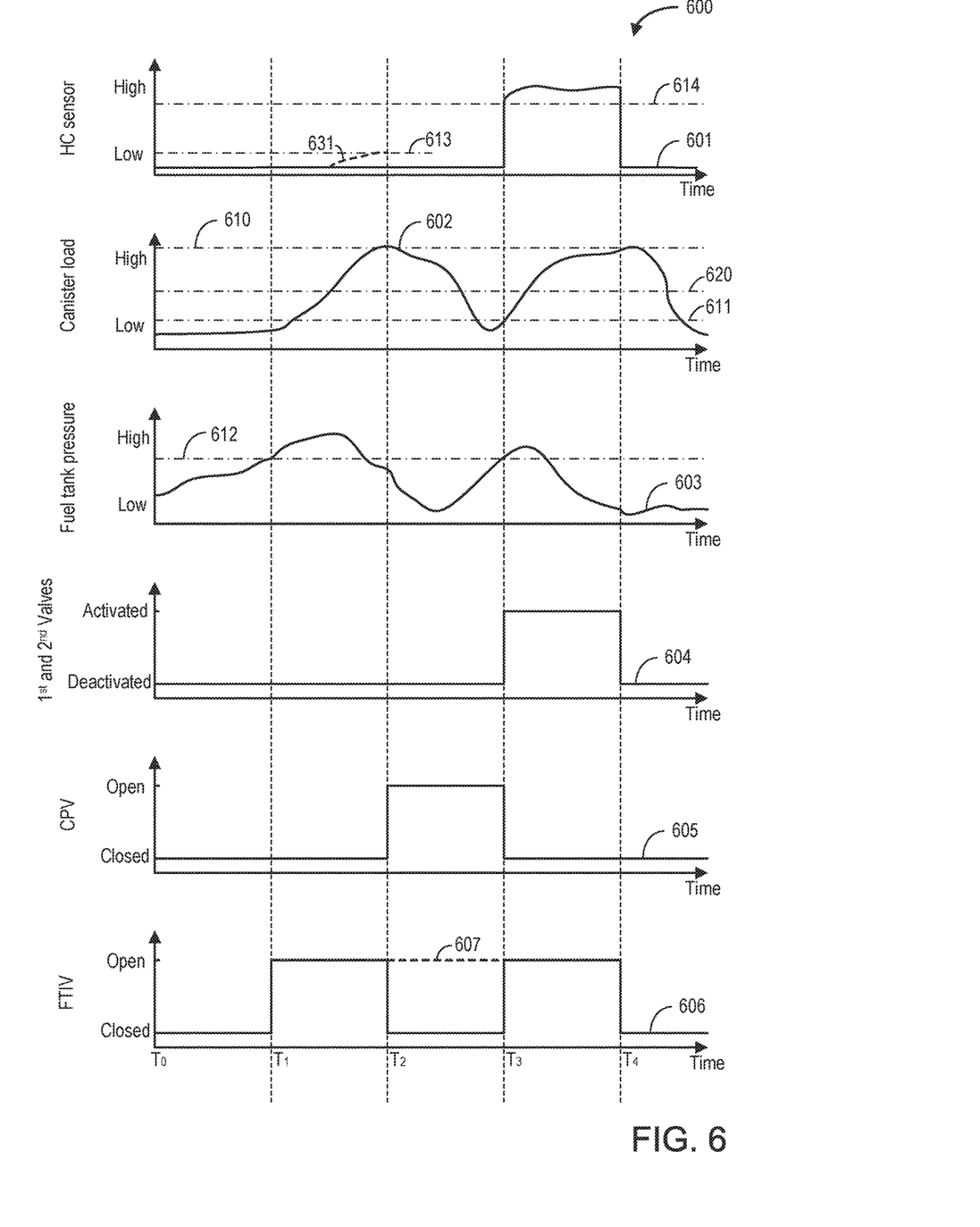
FIG. 6 is a timeline illustrating various operating parameters of the engine while performing the example method.

The following description relates to systems and methods for detecting degradation of a HC sensor in an evaporative emission control (EVAP) system of a vehicle, such as a hybrid vehicle system depicted in FIG. 1. The vehicle may include an engine and a fuel system coupled to the EVAP system, as shown in FIGS. 2-4. Within the EVAP system, the HC sensor may be used to monitor HC breakthrough (e.g., leaking of hydrocarbons) from a fuel vapor canister to the atmosphere. The EVAP system may further include a first valve coupled to a load port of the fuel vapor canister and a second valve coupled to a vent port of the fuel vapor canister. The fuel vapor canister may be loaded by setting the EVAP system in different configurations. As an example, in a first configuration shown in FIG. 3, the first and second valves may be activated during canister loading so that fuel vapors may enter the fuel vapor canister from the purge port. While the valves are activated, a HC sensor rationality check (e.g., diagnosis of operation of the HC sensor) may be performed based on the HC reading output by the HC sensor of HCs exiting the fuel tank. In another example configuration shown in FIG. 4, the first and second valves may be deactivated during canister loading so that fuel vapors may enter the fuel vapor canister through the load port and operation of the HC sensor is not diagnosed. During canister purging, desorbed HCs may be routed from the fuel vapor canister to the engine. Fuel vapors may be purged by flowing fresh air to a vent port of the canister and then flowing desorbed HCs from the purge port to an intake manifold of the engine, as shown in FIG. 2. An example method of performing HC sensor rationality check is shown in FIG. 5. FIG. 6 shows timelines of operating parameters while implementing the method shown in FIG. 5. By flowing fuel vapors past the HC sensor during canister loading, as shown in FIG. 3, the HC sensor may be diagnosed even when the engine is not running. Thus, in hybrid vehicle where the engine may not always be operating and used to propel the vehicle, the HC sensor may still be diagnosed at a desired frequency. Thus, instances of not detecting HC breakthrough to atmosphere due to HC sensor degradation may be reduced, thereby reducing HC emissions from the fuel system.

FIG. 1 illustrates an example vehicle propulsion system 100. Vehicle propulsion system 100 includes a fuel burning engine 10 and a motor 120. As a non-limiting example, engine 10 comprises an internal combustion engine and motor 120 comprises an electric motor. Motor 120 may be configured to utilize or consume a different energy source than engine 10. For example, engine 10 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 10 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 10 is deactivated.

During other operating conditions, engine 10 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 10 may be operated by combusting fuel received from fuel system 140 as indicated by arrow 142. For example, engine 10 may be operated to propel the vehicle via drive wheel 130 as indicated by arrow 112 while motor 120 is deactivated. During other operating conditions, both engine 10 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 10 may propel the vehicle via a second set of drive wheels.

In other embodiments, vehicle propulsion system 100 may be configured as a series type vehicle propulsion system, whereby the engine does not directly propel the drive wheels. Rather, engine 10 may be operated to power motor 120, which may in turn propel the vehicle via drive wheel 130 as indicated by arrow 122. For example, during select operating conditions, engine 10 may drive generator 160 as indicated by arrow 116, which may in turn supply electrical energy to one or more of motor 120 as indicated by arrow 114 or energy storage device 150 as indicated by arrow 162. As another example, engine 10 may be operated to drive motor 120 which may in turn provide a generator function to convert the engine output to electrical energy, where the electrical energy may be stored at energy storage device 150 for later use by the motor.

Fuel system 140 may include one or more fuel storage tanks 44 for storing fuel on-board the vehicle. For example, fuel tank 44 may store one or more liquid fuels, including but not limited to: gasoline, diesel, and alcohol fuels. In some examples, the fuel may be stored on-board the vehicle as a blend of two or more different fuels. For example, fuel tank 44 may be configured to store a blend of gasoline and ethanol (e.g., E10, E85, etc.) or a blend of gasoline and methanol (e.g., M10, M85, etc.), whereby these fuels or fuel blends may be delivered to engine 10 as indicated by arrow 142. Still other suitable fuels or fuel blends may be supplied to engine 10, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 14 may communicate with one or more of engine 10, motor 120, fuel system 140, energy storage device 150, and generator 160. As will be described by the process flow of FIG. 5, control system 14 may receive sensory feedback information from one or more of engine 10, motor 120, fuel system 140, energy storage device 150, and generator 160. Further, control system 14 may send control signals to one or more of engine 10, motor 120, fuel system 140, energy storage device 150, and generator 160 responsive to this sensory feedback. Control system 14 may receive an indication of an operator requested output of the vehicle propulsion system from a vehicle operator 102. For example, control system 14 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 14 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 10.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 44 may be configured to store the fuel received from fuel dispensing device 170 until it is supplied to engine 10 for combustion. In some embodiments, control system 14 may receive an indication of the level of fuel stored at fuel tank 44 via a fuel level sensor. The level of fuel stored at fuel tank 44 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 14. In one example, the control system may adjust engine output and/or the wheel brakes to increase vehicle stability in response to sensor(s) 199.

FIGS. 2-4 show different modes of fuel vapor canister loading and purging for an EVAP system of a vehicle system 206. Components of vehicle system 206 shown in FIGS. 2-4 have similar elements. As such, similar components in FIGS. 3-4 to those of FIG. 2 are numbered similarly and are not re-described below for the sake of brevity. FIG. 2 shows a schematic depiction of vehicle system 206 and a mode for purging fuel vapor canister 22. The vehicle system includes engine 10 coupled to a fuel system and an EVAP system. In some examples, vehicle system 206 may be a hybrid electric vehicle system, such as the HEV system (or propulsion system 100) shown in FIG. 1.

The fuel system may include a fuel tank 44 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system may be a return-less fuel system, a return fuel system, or various other types of fuel system. Fuel tank 44 may hold a plurality of fuel blends, including fuel with a range of alcohol concentrations, such as various gasoline-ethanol blends, including E10, E85, gasoline, etc., and combinations thereof. Fuel may be pumped into the fuel tank from fuel dispensing device via a refueling line 48.

Vapors generated in the fuel system may be routed to the EVAP system which includes a fuel vapor canister 22 via vapor recovery line 31. Vapor recovery line 31 may be coupled to fuel tank 44 via a fuel tank isolation valve (FTIV) 18. As an example, FTIV 18 may be positioned between the fuel tank and the canister within vapor recovery line 31. FTIV 18 may be a normally closed valve, that when opened, allows for the venting of fuel vapors from fuel tank 44 to canister 22. Fuel vapors may then be vented to the atmosphere, or purged to an engine intake manifold 43. Canister purge valve (CPV) 15 is directly coupled to the engine intake manifold 43. Under default conditions, CPV 15 may be closed such that fuel vapors may be vented to the atmosphere.

Pressure sensor 35 may be coupled to vapor recovery line 31 for monitoring pressure within fuel tank 44. Fuel vapor canister 22 may include three ports: load port 33 mechanically coupled to the fuel tank 44 via FTIV 18, a first canister valve 25, and passage 31; purge port 34 mechanically coupled to CPV 15 via passage 28; and vent port 32 mechanically coupled to a second canister valve 26 via passage 27. First and second valves 25 and 26 may be multi-position valves. As an example, first and second valves 25 and 26 may be three-way valves. As another example, first valve 25 may be a three-way valve and second valve 26 may be a three-way stop valve. By activating and deactivating first and second valves 25 and 26, the EVAP system may load canister 22 in two different configurations. When first valve 25 and second valve 26 are in a default, deactivated state (shown in FIGS. 2 and 4), the load port 33 is in direct fluid connection with FTIV 18. Thus, when first and second valves 25 and 26 are in a deactivated state during canister loading, fuel vapors flow from the fuel tank 44 via FTIV 18 and passage 31 to fuel vapor canister 22 via load port 33. When the first and second canister valves 25 and 26 are in a second, activated state (shown in FIG. 3), purge port 34 is in direct fluid connection with FTIV 18. In the second, activated state of first and second valves 25 and 26, fuel vapors flow from fuel tank 44 via FTIV 18 and first valve 25, through passage 119, past HC sensor 38, through passage 120 via second valve 26, and to fuel vapor canister 22 via purge port 34. As a result, when the first and second canister valves 25 and 26 are in the activated state, HC sensor 38 is in a flow path of fuel vapors during fuel vapor canister loading.

Canister 22 may include a buffer 22a (or buffer region), each of the canister and the buffer comprising adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal).

Vehicle system may further include control system 14. Control system 14 may include a controller 12 receiving information from a plurality of sensors 16 (various examples of which are described herein) and sending control signals to a plurality of actuators 81 (various examples of which are described herein) based on the received signals and instructions stored on a memory of the controller 12. The fuel system and EVAP system may be operated by controller 12 in a plurality of modes by selective adjustment of the various valves and solenoids. For example, the vehicle system may be operated in a fuel vapor canister loading mode (e.g., during a fuel tank refueling operation and with the engine not running) or fuel vapor canister purging mode by operating various valves.

FIG. 2 shows the canister 22 in a purging mode. In response to a canister purge request, the controller may command CPV 15 open and FTIV closed. Further, valves 25 and 26 are deactivated to the default (e.g., deactivated) position. Fresh air is drawn by the vacuum in the engine manifold 43 into the EVAP system. The flow of fresh air may be regulated by CVV 17. As shown by the arrows, fresh air is drawn first to valve 26 via opened CVV 17, and then enters canister 22 through the vent port 32. HCs stored in canister 22 are desorbed and exit canister via the purge port 31. Desorbed HCs are then drawn into intake manifold 43 of engine 10 by opening CPV 15. As such, the canister is purged by flowing air from the vent port to the purge port.

FIG. 3 shows an example configuration of the vehicle system 206 during a first canister loading mode. In response to a canister loading request, controller 12 may open FTIV 18 and close CPV 15. Controller may further activate valves 25 and 26 to the activated position. The flow of fuel vapors from fuel tank 44 may be regulated by FTIV 18. Fuel vapors evaporated from the fuel tank first flow to valve 25, through passage 119, and past HC sensor 38 to valve 26. Then, fuel vapors from valve 26 flow through passage 121 and enter buffer 22a through purge port 34. Fuel vapors may first be adsorbed within the buffer, and then, when the buffer is saturated, may be further adsorbed in the canister. Fuel vapors without HCs may exit canister 22 through vent port 32 and be vented to the atmosphere through CVV 17. In this way, HC sensor 38 may be positioned in the flow of fuel vapors exiting canister 22 for monitoring HC breakthrough from the canister and in the flow of fuel vapors entering canister 22 to perform a rationality check of the HC sensor. Since the fuel vapors entering the canister have a relatively high concentration of HC content, sensor degradation may be detected if HC sensor reading is lower than a non-zero threshold, as discussed further below with reference to FIGS. 5-6.

FIG. 4 shows another example configuration of the vehicle system during a second canister loading mode. During the second canister loading mode, fuel vapor canister 22 loading may be performed during conditions where HC sensor rationality check is not requested. In this configuration, FTIV 18 may be opened and the CPV 15 may be closed. Different from the configuration shown in FIG. 3, herein, first and second valves 25 and 26 may be in their default positions. The vent port 32 may be in direct fluid communication with the atmosphere by opening CVV 17. Fuel vapors from the fuel tank may enter buffer 22a through load port 33, and then may be further adsorbed in the canister. As such, the canister is loaded by flowing fuel vapors from the fuel tank to the vent port, in contrast to loading fuel vapor flow in FIG. 3.

FIGS. 2-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As another example, elements positioned apart from each other with only a space there-between and no other components may be referred to as such, in at least one example. The controller 14 receives signals from the various sensors of FIGS. 2-4 and employs the various actuators of FIG. 2-4 to adjust engine operation based on the received signals and instructions stored on a memory of the controller. For example, adjusting valves 25 and 26 may include sending an electrical signal to an actuator of the valves 25 and 26 to move a position of the valves 25 and 26 (such as a valve plate) and thereby adjust the flow path of fuel vapors from fuel tank 44 to fuel vapor canister 22. In another example, the controller may initiate loading of fuel vapor canister 22 in response to output from pressure sensor 35 that indicates that a fuel tank pressure is above a threshold pressure.

FIG. 5 is an example method 500 for performing a rationality check of a HC sensor in a vehicle system, such as vehicle system 206 and HC sensor 38 shown in FIGS. 2-4. In response to a request to vent fuel vapors from a fuel tank, the vehicle system may perform a two-stage loading of a fuel vapor canister. During the first stage, the HC sensor rationality check is performed while fuel vapors containing HCs from the fuel tank are routed past the HC sensor before reaching the fuel vapor canister. When the rationality check is completed, during the second stage, fuel vapors are routed directly to the canister, bypassing the HC sensor. Instructions for carrying out method 500 and the rest of the methods included herein may be executed by a controller (e.g., controller 12 shown in FIGS. 2-4) based on instructions stored on a memory of the controller and in conjunction with signals received from sensors of the engine system, such as the sensors described above with reference to FIGS. 1-4. The controller may employ engine actuators of the engine system to adjust engine operation, according to the methods described below.

Method 500 begins at 501. At 501, vehicle operating conditions are estimated (and/or measured) by a controller. The controller (e.g., controller 12 shown in FIGS. 2-4) acquires measurements from various sensors in the engine system and estimates operating conditions such as engine load, engine speed, fuel tank pressure, and the load of the fuel vapor canister. The fuel tank pressure of the fuel tank may be estimated for example by a fuel tank pressure sensor, such as pressure sensor 35 shown in FIGS. 2-4, coupled between the FTIV and the fuel tank. The controller may further detect states (e.g., activated/deactivated or open/closed) of the first canister valve (e.g. canister valve 25 shown in FIGS. 2-4) and the second canister valve (e.g. canister valve 26 shown in FIGS. 2-4).

At 502, the method includes determining if the fuel tank needs to be vented. For example, venting the fuel tank may include loading the fuel vapor canister by flowing fuel vapors vented from the fuel tank to the fuel vapor canister. As an example, the controller may determine to vent the fuel tank if the measured fuel tank pressure from 501 is higher than a predetermined non-zero threshold pressure. In one example, the controller may receive output from a fuel tank pressure sensor, such as pressure sensor 35 shown in FIGS. 2-4, to determine whether the fuel tank pressure is higher than the pressure threshold. As another example, the controller may determine to vent the fuel tank after vehicle refueling. In one example, the controller may determine that a refueling event has occurred based on sensor output that a door and/or cap coupled to a refueling line of the fuel tank has been opened. In another example, the controller may determine that a refueling event has occurred in response to an increase in fuel level greater than a threshold fuel level increase based on output from a fuel level sensor.

If it is determined that the fuel tank does not need to be vented, method 500 moves on to 504, wherein the fuel tank may be isolated from the EVAP system by closing the FTIV (e.g., FTIV 18 shown in FIGS. 2-4). At 505, the controller determines whether the fuel vapor canister needs to be purged. For example, the controller may indicate or request canister purging based on the load of the fuel vapor canister determined at 501, for example as a function of the loading. In one example, the controller may receive output from an oxygen sensor, such as a heat exhaust gas oxygen sensor, and estimate the load of the fuel vapor canister as a function of an air/fuel ratio determined from the oxygen sensor output. As one example, increased loading may trigger a request for canister purging, for example when the determined canister load is above a threshold load. As another example, the controller may determine a need to purge the canister after a predetermined duration from a last canister purging event. The controller may further determine the necessity of canister purging in response to a refueling event. Further still, the controller may determine the necessity of canister purging based on ambient temperature. For example, the request for canister purging may be a function of the ambient temperature, with increased ambient temperature translating via a mathematical function to increased purging requests. As another example, a look-up table may be used where ambient temperature is the input and a modifier to reduce a time between purges is the output. If the controller determines not to purge the canister at 505, method 500 continues monitoring operating conditions at 506. However, if controller determines to start canister purging, method 500 moves to 511.

At 511, the controller may deactivate the first canister valve and the second canister valve to the default position and open the CPV to allow vacuum in the engine manifold to draw fresh air through the canister (as shown in FIG. 2). Fresh air flows through the HC sensor and the second valve before reaching the vent port of the fuel vapor canister. Purge flow in the canister flows from the vent port (e.g., port 32 in FIG. 2) to the purge port (e.g. port 34 in FIG. 2). The desorbed HCs flow from the vent port into the engine manifold through the CPV.

At 513, method 500 includes determining if canister purge is completed. As an example, canister purging may be considered completed if an estimated load of the canister is lower than a threshold. As another example, canister purging may be considered completed after purging for a predetermined time period. If canister purging has not been completed, the method includes maintaining the position of the first and second valves and the CPV at 515. At 515, the controller may maintain the first and second canister valves in the deactivated positions and the CPV in the open position to continue canister purging. Otherwise, if canister purge has been completed, method 500 moves on to 523 where the controller may close the CPV.

Returning to 502, if the controller determines to vent the fuel tank, the method continues to 507. In one example, the controller may vent the fuel tank (e.g. load the fuel vapor canister) during vehicle off or engine off conditions. At 507, the controller determines if HC sensor rationality check should be performed. As an example, the controller may determine performing HC sensor rationality check based on the duration from last rationality check. For example, the controller may make a logical determination of whether a HC sensor rationality check should be performed based on logic rules that are a function of the duration since a last rationality check of the HC senor. Specifically, if the duration since the last rationality check is greater than a set duration, the controller may generate a request to perform the HC sensor rationality check, such as setting a diagnostic flag or continuing on to 509, as described below. As another example, the controller may determine performing HC sensor rationality check based on (e.g., as a mathematical function of) vehicle operating conditions. If controller determines not to perform sensor rationality check, method 500 moves to 508. Otherwise, method 500 moves to 509.

At 508, the controller may deactivate the first and second valves and open the FTIV to allow fuel vapors from the fuel tank to enter the canister through the load port (as shown in FIG. 4). When the first and second valves are in deactivated positions, fuel vapors flow through the FTIV and the first valve before reaching the load port of the fuel vapor canister. Further, HCs in the fuel vapors are adsorbed and stored in the canister as fuel vapors flow through the fuel vapor canister to the fresh air side of the canister via a vent port. The method at 508 continues to 517 wherein the controller determines whether canister breakthrough is detected. At 517, the HC sensor coupled between the vent port of the canister and the atmosphere (e.g., sensor 38 in FIG. 2) monitors HC content in the vented fuel vapors to the atmosphere. If the HC content is higher than a threshold amount, method 500 moves on to 518 to indicate HC breakthrough from the canister and set corresponding diagnostic code. The controller may further close the FTIV and open the CPV to perform canister purging at 519. If canister breakthrough is not detected at 517, the method continues at 520 to continue fuel vapor canister loading, as described further below.

Alternatively, if the controller determines to perform sensor rationality check at 507 of the method, the method continues to 509. At 509, the controller may activate the first and second valves and open FTIV to run HC sensor rationality check so that the fuel vapor canister enters the loading mode (as shown in FIG. 3). As shown in FIG. 3, during the loading mode that includes HC sensor rationality check, fuel vapors enter the canister through the purge port. Fuel vapors exiting the fuel tank flow through the FTIV and the first canister valve, past the HC sensor, to the fresh air side of the fuel vapor canister, and then through the second canister valve to the purge port of the fuel vapor canister. Further, HCs in the fuel vapors are adsorbed and stored in the canister. The controller may determine HC sensor degradation based on the measurement of HC loading of the HCs exiting the fuel tank flowing to the purge port. For example, the controller may determine HC sensor degradation as a function of the measurement of HC loading of the HCs flowing to the fuel vapor canister, for example by comparing the measurement to a threshold or a threshold that varies as a function of temperature.

At 510, the method includes determining whether the HC reading is above a threshold. As one example, at 510, the measured HC loading may be compared to a non-zero threshold. As another example, the non-zero threshold may be determined as a function of a load of the fuel vapor canister, with the threshold increasing with increasing loading, or from a look-up table with loading as the input and the threshold as the output, the look-up table calibrated with values based on example operation and/or testing. As yet another example, the non-zero threshold may be determined based on the operating conditions of the engine. If the HC loading is lower than the non-zero threshold, sensor degradation may be determined. Consequently, the controller may indicate sensor degradation at 512 by setting a corresponding diagnostic code. The controller may further indicate sensor degradation to vehicle driver at 512. Indicating degradation of the HC sensor at 512 may include and/or result in setting a diagnostic flag in the controller and/or notifying a vehicle operator (e.g., via an audible or visible signal which indicates the HC sensor needs to be serviced and/or replaced). Then, the method at 512 proceeds to 524 wherein the controller may deactivate first and second valves and close FTIV responsive to determining sensor degradation. By deactivating the first and second valves and closing FTIV, the controller may stop the flow of fuel vapors from the fuel tank to the fuel vapor canister to end canister loading. Optionally, the controller may open CPV at 526 to purge the canister in response to determining sensor degradation.

However, if the measured HC loading in the desorbed gas is higher than the non-zero threshold, the controller may clear corresponding diagnostic code at 514. The controller may further store the time that the rationality check is performed in the memory for future reference.

At 516, after finishing HC sensor rationality check, the controller deactivates the first and second valves to the default state, and finishes loading of the canister by flowing fuel vapors from the fuel tank to the load port of the canister (as shown in FIG. 4). For example, the controller may deactivate the first and second canister valves after a time period. The time period may be determined based on operating conditions, fuel tank pressure, and/or canister load. As an example, the controller may deactivate the first and second valves based on canister load. For example, the controller may deactivate the first and second valves to complete the HC rationality check when a threshold canister load is reached.

At 520, method 500 determines if canister loading is completed. As an example, canister loading may be considered completed if an estimated load of the canister is greater than a threshold. As another example, canister loading may be considered completed after loading for a predetermined time period. The time period may be determined based on (e.g., as a mathematical function of) operating conditions, canister load, and/or a duration of FTIV opening to ensure that the fuel tank is sufficiently vented. If canister loading has not been completed, method 500 maintains valve position at 521. At 521, the controller may maintain the first and second canister valves in activated positions and the FTIV in the open position to continue canister loading. Otherwise, if canister loading has been completed, method 500 moves on to 522 wherein the controller may close the FTIV.

In FIG. 6, graph 600 illustrates example purging and loading operations for a fuel vapor canister and performing a rationality check of a HC sensor fluidly coupled to a fresh air side of the fuel vapor canister. For example, graph 600 shows changes in a HC sensor (e.g., HC sensor 38 shown in FIGS. 2-4) reading (or output) at plot 601, a fuel canister load of a fuel canister (e.g., canister 22 shown in FIGS. 2-4) at plot 602, fuel tank pressure of a fuel tank (e.g., fuel tank 44 shown in FIGS. 2-4) at plot 603, a state (or position) of first and second canister valves at plot 604, a state (or position) of a CPV (e.g., CPV 15 shown in FIGS. 2-4) at plot 605, and a state of FTIV (e.g., FTIV 18 shown in FIGS. 2-4) at plot 606. For each operating parameter, time is depicted along the horizontal axis and values or state (e.g. open or closed) of each respective operating parameter are depicted along the vertical axis.

At $T_0$, since the fuel tank pressure 603 is lower than a non-zero threshold pressure 612, the CPV and FTIV remain closed so that the fuel vapor canister is isolated from the engine and the fuel tank.

From $T_0$ to $T_1$, fuel tank pressure 603 increases. In one example, fuel tank pressure increases in response to a refueling event. In another example, fuel tank pressure increases as a duration a vehicle spends sitting in the sun increases.

At time $T_1$, in response to fuel tank pressure 603 being higher than threshold pressure 612, the FTIV is opened so that fuel vapor may be vented through the fuel vapor canister to the atmosphere, as shown in FIG. 4. As such, the fuel vapor canister enters a loading mode. At $T_1$, canister loading without a HC sensor rationality check is requested. As fuel vapors flow through the canister, canister load 602 increases from $T_1$ to $T_2$ and fuel tank pressure decreases. The HC sensor (e.g., sensor 38 in FIG. 2) monitors HC breakthrough from the fuel vapor canister during this time. HC breakthrough may be determined by an HC sensor reading that is (e.g., 631) higher than a non-zero threshold 613.

At time $T_2$, in response to the fuel vapor canister load 611 being higher than a non-zero threshold 610, the controller indicates canister purging. Alternatively, the controller may indicate canister purging responsive to HC breakthrough 631. If operating conditions are suitable for canister purging, the controller opens the CPV so that the vacuum in the engine manifold may draw purge flow through the canister, as shown in FIG. 2. Purge flow in the canister is in a direction from the vent port to the purge port. As stored HCs being desorbed from the canister, canister load 602 continues decreasing from $T_2$ to $T_3$. As an example, the FTIV may be closed to isolate the fuel tank from the EVAP system. As another example, the FTIV may be opened during canister purging, so that fuel vapor from the fuel tank may be drawn to the engine intake manifold. At $T_3$, in response to canister load lower than a third threshold 611, the controller may close the CPV and FTIV to finish the canister purging process. The controller may alternatively end canister purging after a predetermined period.

Further, from $T_2$ to $T_3$, fuel tank pressure 603 initially decreases and then increases so that the fuel tank pressure is higher than threshold pressure 612 at $T_3$. At $T_3$, in response to fuel tank pressure 603 being higher than the threshold pressure 612, the FTIV is opened so that fuel vapor may be vented from the fuel tank. Further, the controller activates the first and second canister valves to perform HC sensor rationality check. As such, fuel vapors flow from the fuel tank to a purge port of the canister, as shown in FIG. 3. As fuel vapors from the fuel tank flow to the canister, canister load 602 increases from $T_3$ to $T_4$ and fuel tank pressure 603 decreases. The HC sensor reading 601 is increased during the same time period. If the HC sensor reading is higher than a non-zero threshold 614, the controller may determine that no degradation is detected. Otherwise, if the HC sensor reading is lower than the non-zero threshold 614, the controller may indicate sensor degradation.

From $T_3$ to $T_4$, fuel tank pressure 603 decreases below the threshold pressure 612. At $T_4$, in response to the HC sensor reading being greater than the threshold 614, the controller deactivates the first and second canister valves and closes the FTIV to finish the canister loading process. In another example, the controller may deactivate the first and second canister valves to start a second stage of canister loading, wherein fuel vapors flow from the fuel tank to a load port of the canister, as shown in FIG. 4. For example, the second stage of canister loading may be started when the HC sensor rationality check is completed. As another example, the second stage of canister loading may be started when the canister load is greater than a second threshold 620.

At time $T_4$, in response to fuel tank pressure 603 below the threshold pressure 612, the controller may close the FTIV to finish the canister loading process. The controller may alternatively end canister loading after a predetermined period.

In this way, a HC rationality check may be performed during fuel vapor canister loading, such that the rationality check may be performed during engine off conditions. For plug in hybrid electric vehicles, which may be driven almost exclusively in electric mode with the engine off, opportunities to test for HC sensor degradation, such as during canister purging, may be limited. By performing the sensor rationality check during canister loading, the HC sensor may be exposed to relatively high levels of HCs and the rationality check may be performed during engine off conditions. The technical effect of actuating one or more valves to flow fuel vapors first to a fresh air side of a fuel vapor canister and second to a purge port of the fuel vapor canister is to flow a higher level of HCs past a HC sensor couple to one of the one or more valves coupled to the fresh air side of the fuel vapor canister. As a result, the HC sensor may be more effectively diagnosed. If the HC sensor is diagnosed as being degraded during this check, the sensor may be service or replaced, thereby reducing the occurrence of undetected HC breakthrough events and reducing engine emissions.

As one embodiment, a method includes, during loading of a fuel vapor canister, actuating one or more valves to flow fuel tank vapors from a fuel tank to a first valve coupled to a fresh air side of the fuel vapor canister; sensing hydrocarbons with a sensor positioned in a flow path of the fuel tank vapors and fluidly coupled to fresh air; and diagnosing operation of the sensor based on the sensed hydrocarbons. In a first example of the method, the method further comprises flowing fuel vapors from the fuel tank to a load port of the fuel vapor, sensing fuel vapors vented from the fuel vapor canister to atmosphere via the sensor, and wherein the first valve is one of the one or more valves that are actuated during loading of the fuel vapor canister. A second example of the method optionally includes the first example and further includes wherein the flow of the fuel tank vapors is from the fuel tank, past the sensor, to the first valve, and then to a purge port of the fuel vapor canister. A third example of the method optionally includes one or more of the first and second examples, and further includes wherein diagnosing operation of the sensor includes determining that the sensor is degraded in response to the sensed hydrocarbons being at a level that is lower than a non-zero threshold. A fourth example of the method optionally includes the first through third examples, and further comprises bypassing the sensor during loading of the fuel vapor canister in response to determining sensor degradation. A fifth example of the method optionally includes the first through fourth examples, and further comprises loading the fuel vapor canister while an engine is off and a vehicle in which the engine is installed is being propelled via motor torque. A sixth example of the method optionally includes one or more of the first through fifth examples, and further comprises flowing fresh air from the fresh air side of the fuel vapor canister, through the fuel vapor canister to the purge port, and then to the engine after loading of the fuel vapor canister is completed. A seventh example of the method optionally includes the first through sixth examples, and further includes wherein actuating the one or more valves includes activating two valves, via an electronic controller, where each valve of the two valves is in direct fluid communication with the fuel vapor canister and wherein the two valves includes the first valve. An eighth example of the method optionally includes the first through seventh examples, and further includes wherein the two valves are two three-way valves. A ninth example of the method optionally includes the first through eighth examples, and further comprises wherein actuating the first valve is included in the one or more valves and wherein the one or more valves to flow fuel tank vapors to the fresh air side of the fuel vapor canister includes actuating a second valve positioned in a passage between the fuel tank and the fuel vapor canister into a first position that directs fuel vapors from the fuel tank to the fresh air side of the fuel vapor canister and the first valve positioned in a passage to the fresh air side of the fuel vapor canister into a first position that directs fuel vapors to a purge port of the fuel vapor canister. A tenth example of the method optionally includes the first through ninth examples, and further includes wherein a default position of the second valve includes a second position where fuel vapors from the fuel tank are directed to a load port of the fuel vapor canister and a default position of the first valve includes a second position where fuel vapors from the fuel vapor canister are vented to the atmosphere.

As another embodiment, a method comprises during a first condition, flowing fuel vapors from a fuel tank to a load port of a fuel vapor canister and through a vent port of the fuel vapor canister; and during a second condition, flowing fuel vapors from the fuel tank to a purge port of the fuel vapor canister, detecting a hydrocarbon load of the fuel vapor canister via a hydrocarbon sensor positioned in a flow path of the fuel vapors entering the fuel vapor canister through the purge port, and determining sensor degradation of the hydrocarbon sensor based on the detected hydrocarbon load. In a first example of the method, the method further includes wherein the flowing fuel vapors from the fuel tank to the purge port during the second condition includes activating a first valve directly coupled to the load port of the fuel vapor canister and activating a second valve directly coupled to the purge port. A second example of the method optionally includes the first example and further includes wherein the hydrocarbon sensor is fluidly coupled between the first and second valves. A third example of the method optionally includes one or more of the first and second examples, and further includes during the second condition, the purge port of the fuel vapor canister is in direct fluid communication with the fuel tank. A fourth example of the method optionally includes the first through third examples, and further comprises indicating sensor degradation of the hydrocarbon sensor in response to the detected hydrocarbon load being lower than a non-zero threshold. A fifth example of the method optionally includes the first through fourth examples, and further includes wherein the non-zero threshold is determined based on a load of the fuel vapor canister.

As yet another embodiment, a n evaporative emission control system for an engine, includes: a fuel tank; a fuel vapor canister coupled to the fuel tank; a first valve positioned between the fuel tank and a load port of the fuel vapor canister; a second valve positioned between a vent port and a purge port of the fuel vapor canister; a hydrocarbon sensor coupled between the second valve and a third valve fluidly coupled to fresh air; and a controller configured with computer readable instructions stored on non-transitory memory for: venting fuel vapors from the fuel vapor canister to atmosphere via the first valve, and sensing the vented fuel vapors with the hydrocarbon sensor; in response to a request for a sensor rationality check, flowing fuel vapors from the fuel tank to a fresh air side of the fuel vapor canister and through the purge port of the fuel vapor canister to the vent port via the first valve and second valve, and performing a rationality check of the hydrocarbon sensor; and in response to completion of the rationality check, flowing fuel vapors from the fuel tank to the load port of the fuel vapor canister and through the fuel vapor canister to the vent port. In a first example of the system, the system further includes wherein the request for the sensor rationality check is generated in response to a pressure of the fuel tank is greater than a threshold. A second example of the system optionally includes the first example and further includes wherein the controller is further configured with computer readable instructions for flowing fresh air from the first valve to the fuel vapor canister and then from the fuel vapor canister to the intake manifold via the second valve in response to an estimated load of the fuel vapor canister being lower than a non-zero threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine comprising:
during loading of a fuel vapor canister,
actuating one or more valves to flow fuel tank vapors from a fuel tank to a first valve coupled to a load port of the fuel vapor canister and a fresh air side of the fuel vapor canister;
sensing hydrocarbons with a sensor positioned on the fresh air side of the fuel vapor canister and in a flow path of the fuel tank vapors, wherein the fuel tank vapors flow past the sensor before entering the fuel vapor canister; and
diagnosing operation of the sensor based on the sensed hydrocarbons.

2. The method of claim 1, further comprising flowing fuel tank vapors from the fuel tank to the load port of the fuel vapor canister, sensing fuel tank vapors vented from the fuel vapor canister to atmosphere via the sensor, and wherein the first valve is one of the one or more valves that are actuated during loading of the fuel vapor canister.

3. The method of claim 1, wherein the flow path of the fuel tank vapors is from the fuel tank, to the first valve, past the sensor, and then into the fuel vapor canister through a purge port of the fuel vapor canister.

4. The method of claim 1, wherein diagnosing operation of the sensor includes determining that the sensor is degraded in response to the sensed hydrocarbons being at a level that is lower than a non-zero threshold.

5. The method of claim 4, further comprising bypassing the sensor during loading of the fuel vapor canister in response to determining sensor degradation.

6. The method of claim 1, further comprising loading the fuel vapor canister while the engine is off and a vehicle in which the engine is installed is being propelled via motor torque.

7. The method of claim 3, further comprising flowing fresh air from the fresh air side of the fuel vapor canister, through the fuel vapor canister to the purge port, and then to the engine after loading of the fuel vapor canister is completed.

8. The method of claim 1, wherein actuating the one or more valves includes activating two valves, via an electronic controller, where each valve of the two valves is in direct fluid communication with the fuel vapor canister and wherein the two valves include the first valve.

9. The method of claim 8, wherein the two valves are two three-way valves.

10. The method of claim 1, wherein the first valve is included in the one or more valves and wherein actuating the one or more valves to flow fuel tank vapors to the fresh air side of the fuel vapor canister includes actuating a second valve positioned in a passage between the fuel tank and the fuel vapor canister into a first position that directs fuel tank vapors from the fuel tank to the fresh air side of the fuel vapor canister and the first valve positioned in a passage to the fresh air side of the fuel vapor canister into the first position that directs fuel tank vapors to a purge port of the fuel vapor canister.

11. The method of claim 10, wherein a default position of the second valve includes a second position where fuel tank vapors from the fuel tank are directed to the load port of the fuel vapor canister and a default position of the first valve includes a second position where fuel tank vapors from the fuel vapor canister are vented to atmosphere.

12. A method for an engine, comprising:
   during a first condition, flowing fuel vapors from a fuel tank to a load port of a fuel vapor canister and through a vent port of the fuel vapor canister; and
   during a second condition, flowing fuel vapors from the fuel tank, then to a hydrocarbon sensor positioned on a fresh air side of the fuel vapor canister, and then to a purge port of the fuel vapor canister, detecting a hydrocarbon load of the fuel vapors via the hydrocarbon sensor positioned in a flow path of the fuel vapors between the fuel tank and where the fuel vapors first enter the fuel vapor canister through the purge port, and determining sensor degradation of the hydrocarbon sensor based on the detected hydrocarbon load.

13. The method of claim 12, wherein the flowing fuel vapors from the fuel tank to the purge port during the second condition includes activating a first valve directly coupled to the load port of the fuel vapor canister and activating a second valve directly coupled to the purge port.

14. The method of claim 13, wherein the hydrocarbon sensor is fluidly coupled between the first and second valves.

15. The method of claim 12, wherein, during the second condition, the purge port of the fuel vapor canister is in direct fluid communication with the fuel tank.

16. The method of claim 12, further comprising indicating sensor degradation of the hydrocarbon sensor in response to the detected hydrocarbon load being lower than a non-zero threshold.

17. The method of claim 16, wherein the non-zero threshold is determined based on a load of the fuel vapor canister.

18. An evaporative emission control system for an engine, comprising:
   a fuel tank;
   a fuel vapor canister coupled to the fuel tank;
   a first valve positioned between the fuel tank and a load port of the fuel vapor canister;
   a second valve positioned between a vent port and a purge port of the fuel vapor canister;
   a hydrocarbon sensor coupled between the second valve and a third valve fluidly coupled to fresh air; and
   a controller configured with computer readable instructions stored on non-transitory memory for:
      venting fuel vapors from the fuel vapor canister to atmosphere via the second valve, and sensing the vented fuel vapors with the hydrocarbon sensor positioned on a fresh air side of the fuel vapor canister;
      in response to a request for a sensor rationality check, flowing fuel vapors from the fuel tank to the fresh air side of the fuel vapor canister, the fuel vapors then entering the fuel vapor canister through the purge port and continuing through the fuel vapor canister to the vent port via the first valve and the second valve, and performing a rationality check of the hydrocarbon sensor; and
      in response to completion of the rationality check, flowing fuel vapors from the fuel tank to the load port of the fuel vapor canister and through the fuel vapor canister to the vent port.

19. The system of claim 18, wherein the request for the sensor rationality check is generated in response to a pressure of the fuel tank being greater than a threshold.

20. The system of claim 18, wherein the controller is further configured with computer readable instructions for flowing fresh air from the first valve to the fuel vapor canister and then from the fuel vapor canister to an intake manifold via the second valve in response to an estimated load of the fuel vapor canister being lower than a non-zero threshold.

* * * * *